G. C. EATON.
FEEDING APPARATUS.
APPLICATION FILED FEB. 5, 1908.
907,227.
Patented Dec. 22, 1908.
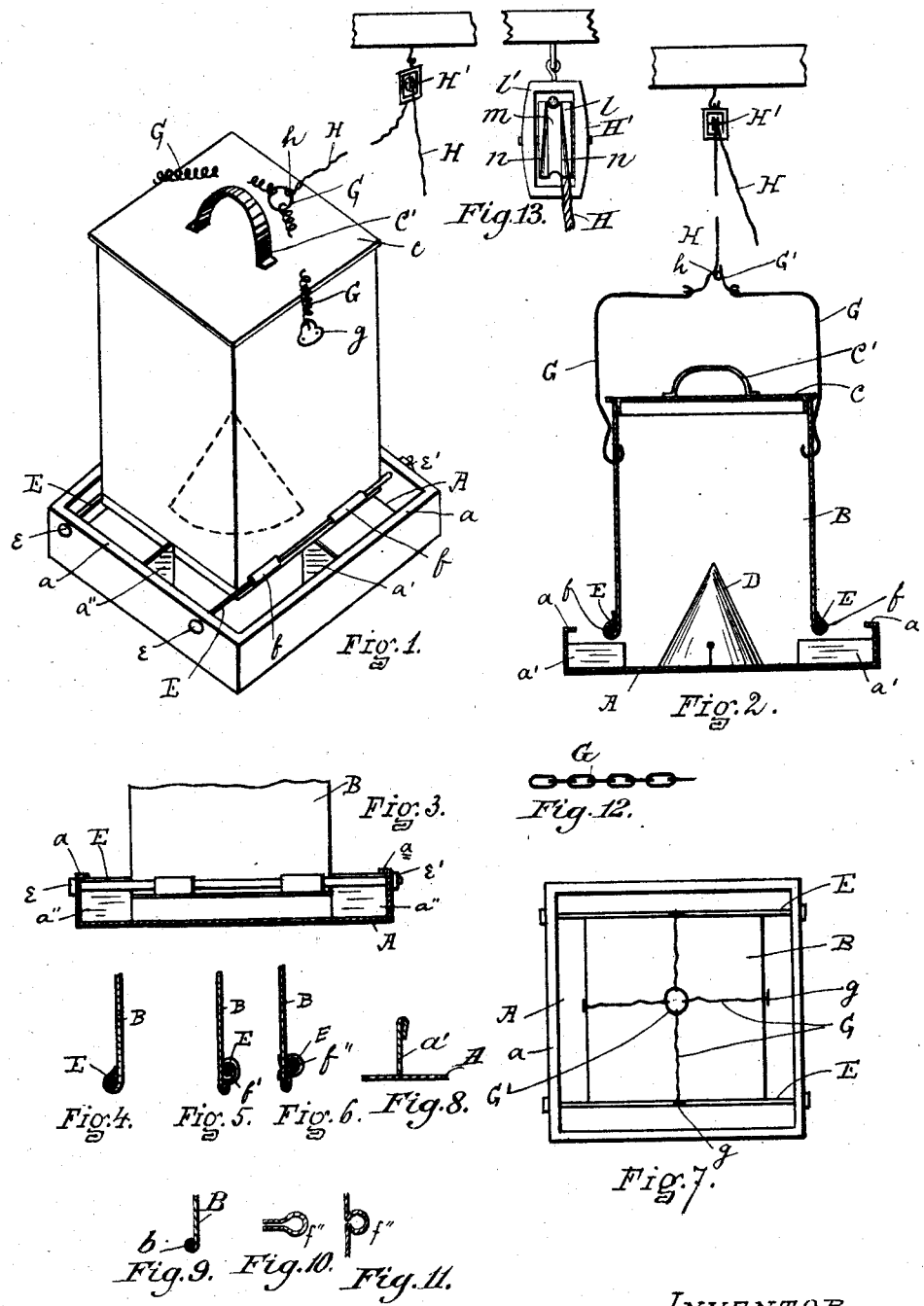
WITNESSES
Rich. A. George
E. A. De Giorgi
INVENTOR
GEORGE C. EATON.
BY Risley & Love
ATTORNEYS.

UNITED STATES PATENT OFFICE.

GEORGE C. EATON, OF NORWICH, NEW YORK.

FEEDING APPARATUS.

No. 907,227.     Specification of Letters Patent.     Patented Dec. 22, 1908.

Application filed February 5, 1908. Serial No. 414,328.

*To all whom it may concern:*

Be it known that I, GEORGE C. EATON, a citizen of the United States, residing at Norwich, in the county of Chenango and State of New York, have invented certain new and useful Improvements in Feeding Apparatus, of which the following is a specification, reference being had therein to the accompanying drawing.

My invention relates to an improved feeding apparatus, and I declare the following is a full, clear, concise and exact description thereof, sufficient to enable one skilled in the art to make and use the same, reference being had to the accompanying drawings in which like reference characters refer to like parts throughout.

The features of the invention may be given a wide variety of forms and arrangements and are shown in one form in the accompanying drawings, certain modifications being therein also pointed out.

The device in which the invention is disclosed pertains particularly to the feeding of dry mash or the like to poultry and is intended to overcome various objections to other forms of such devices, such as expense of manufacture, complicated construction and consequent necessity of care, wastefulness and inherent inadaptability to the purposes.

It is recognized by many that the best results are secured when such a device is suspended in the air, at the proper height for the fowls or other animals, among other reasons because this places it above the reach of vermin and rats. At the same time the device must be so supported as to be maintained substantially level and furthermore must be at the proper height for the particular breed of fowls to be fed.

In the device here shown, I provide means whereby the first of these conditions is met by the use of the means supporting the apparatus, by which it hangs level, and the second I have met by the adaptation of means for readily adjusting the height to conditions and for raising it entirely above reach of the fowls. By having the feed at such a height that the fowl can reach over the edge of the device it obviates the scattering of feed by side-swiping, which causes considerable loss when the feed is too low or on the ground. At the same time an additional construction may be employed which will prevent any possibility of loss in such manner.

The chief features of the invention are, then, providing a hanging and normally level feed reservoir, capable of ready adjustment and fixing at different heights, with an unobstructed feed-opening with interior overhang and a free discharge outlet with interior means for facilitating the discharge, the device being simple and cheap in construction, economical, and convenient.

Referring to the drawings, Figure 1 is a perspective view of the device, the dotted lines indicating the position of an interior conical or pyramidal construction for spreading the contents. Fig. 2 is a cross-section view with a different suspending device or bail. Fig. 3 is a detail view of one of the rods which support the reservoir on the trough or base member, with a portion of the reservoir wall. Fig. 4 is a sectional view showing one way of fixing the bottom edge on one side of the reservoir. Figs. 5 and 6 are different detail views in section of means for engaging the supporting rods. Fig. 7 is a top view to illustrate a modified method of hanging the device. Figs. 8 and 9 are sectional views of parts of the device. Figs. 10 and 11 show a clip, before and after being applied to the construction, respectively. Fig. 12 is a detail of one form of the supporting member, and Fig. 13 is a view of a pulley adapted to engage the means by which the device is suspended. Fig. 14 is a perspective view of the cover.

Referring to the figures in detail, A is the base of the device and consists of a pan, with its side walls having their upper edges turned horizontally inward in the interior flanges *a*, *a*. This I consider a feature of much importance. The device is suspended high enough so that the fowls have to reach up over the edge and it is found, by experience with the device, that the flange prevents the fowl from plucking or throwing the feed out of the pan or trough, the beak striking the flange and preventing any waste.

In my experience with the device I have found that under these conditions there is practically no waste nor any side-swiping. Others may prefer, however, to have additional safeguard against waste and at *a′* I show a partition extending inwardly from the side wall, one on each side being thought to be sufficient, and which consists of a sheet of metal or the like, properly secured to the pan, having its upper edge wide or dull enough to prevent harm to the beak of the fowl (as by upsetting the edge of the metal sheet, Fig. 8). The sheet need not extend up as high as the side-wall of the pan nor into the interior, or reservoir, though the latter feature is illustrated in Figs. 1 and 2.

B is the reservoir which is of substantially less horizontal size than the pan and may be of a suitable height, the pan and the reservoir being of corresponding relative dimensions in the different sizes of the device. It is provided with cover C constructed in the usual manner of making a cover and is provided with hand C' as seen in Fig. 14. The lower edge of the reservoir requires certain stiffness or rigidity to resist the outward pressure of the contents, the pan having fixed thereon a centrally located cone or pyramid D to disperse the contents towards the edges. This rigidity may be secured by upsetting the edge of the four sides B and inclosing a wire b as is common in the tinsmith's art and as seen in Fig. 9. On two opposite sides this necessity is obviated by use for such purpose of the means which support the reservoir above the pan. E shows rods passed through opposite walls of the pan, each having a head e at one end and being threaded at the other end for a nut e'. The upset which would receive the wire or rod in the familiar construction above suggested receives instead the rod E and supports the reservoir firmly on the pan. In practice, however, the edge of the reservoir need not be upset on a curve for its entire length but only at points as at f, f, Figs. 1 and 2. The edges, at other places, may be slightly upset or curled so as to avoid the exposure of a cutting edge.

In Fig. 5 it is seen that a short piece of tubing, f', may be soldered onto the reservoir to receive the rod E or, as in Fig. 6, an annular clip f'', Figs. 10 and 11, may be provided with ends to be passed through the wall of the reservoir and there secured in place. The walls which are not thus finished may have the edge curled for a rod, as in Fig. 4, or upset as seen in Fig. 1, which will give enough stiffness ordinarily. But where the intermediate partitions are used they may be brought just to the wall as at a'' in Figs. 1 and 3, thus forming a brace.

The hanging means consists of two or more chains, rods, wires, or the like, as G, of equal length, secured to the reservoir as at g and united to a ring, clip or the like, G', so that the supporting means attached to the ring or clip insures that the device hangs level. In Fig. 1 two chains are shown, attached to opposite sides of the reservoir, which I have found sufficient for the purpose. In Fig. 7, however, four such chains, cords, wires, or the like are indicated, as before of equal length and brought to a common center. In Fig. 2 I show wires as used for this purpose, each engaging by its hook the reservoir wall and formed to provide clearance for the cover, and with a uniting clip or ring. To the clip or ring G is secured a cord or pliable wire H, such as picture wire of suitable size, by a catch h, which then passes through a lock pulley H' suspended at a proper point so that the user can raise or lower the apparatus and secure it at a given height.

The pulley consists of wheel l in block l'. The wheel has a peripheral groove m from which diverge side grooves n, n. By the cord H, which passes over the pulley wheel, the apparatus may be raised. The operator holds the cord to one side or the other of the perpendicular center of the wheel and letting the apparatus lower, the cord H passes into one of the side grooves and is engaged between the face of the groove and the block l' and thereby the apparatus may be held at any desired height.

While I have illustrated the device in certain forms, I do not intend to limit my invention by the particulars of the drawings.

Having described my invention, what I claim as new and desire to secure by Letters Patent, is:

1. A feed apparatus comprising a pan with an inward peripheral flange at the top, intermediate vertical partitions extending inwardly from the adjacent side-wall of the pan, a reservoir of lesser sectional area than the pan, rods passing through opposite walls of the pan, means on the reservoir holding the rods against the adjacent wall of the reservoir whereby to support it, the said rods forming stiffening means for the walls of the reservoir on their respective sides and the said partitions providing stiffening means for the walls on the other sides of the reservoir.

2. In a feeding apparatus, the combination of a pan with side walls having the upper edge thereof turned inwardly around the pan, a reservoir of less horizontal area than the pan, a plurality of rods passing through opposite walls of the pan near the top thereof, and along opposite sides of the reservoir and engaging and supporting the same with the bottom edge of its walls slightly below the top edge of the pan, whereby an unobstructed outlet is provided on all sides from the reservoir into the pan and from the pan into the space between the side walls thereof and the walls of the reservoir, and a member centrally mounted on the pan with downwardly diverging walls, the edge of its base being a substantial distance within the line of the walls of the reservoir, substantially as described.

3. A feeding apparatus consisting of a reservoir and a pan, the former rigidly supported on the latter substantially central thereof, rods provided for such support and passing through the walls of the pan near the top and engaging those of the reservoir near the bottom and bearing against the two opposite walls of the reservoir, substantially as described.

4. A feeding apparatus consisting of a pan with an inward peripheral flange at the top, a reservoir mounted within the area of the pan, rods passing through opposite walls of the reservoir and connected therewith whereby to support the same and form stiffening means for opposite walls of the reservoir, substantially as described.

In testimony whereof I affix my signature in presence of two witnesses.

GEORGE C. EATON.

Witnesses:
E. T. DE GIORGI,
HENRY M. LOVE.